(12) United States Patent
Yoo et al.

(10) Patent No.: US 6,321,695 B1
(45) Date of Patent: Nov. 27, 2001

(54) MODEL-BASED DIAGNOSTIC METHOD FOR AN ENGINE COOLING SYSTEM

(75) Inventors: In Kwang Yoo, Ann Arbor; Kenneth M. Simpson, Howell; Stephen F. Majkowski, Rochester Hills, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/451,960

(22) Filed: Nov. 30, 1999

(51) Int. Cl.[7] .................................................. F01P 5/14
(52) U.S. Cl. ..................................... 123/41.15; 123/198 D
(58) Field of Search ........................... 123/41.15, 198 D; 73/117.3, 118.1

(56) References Cited

U.S. PATENT DOCUMENTS

| 4,534,214 | * | 8/1985 | Takahashi | 73/118 |
| 4,546,646 | * | 10/1985 | Takahashi | 73/117.3 |
| 4,669,426 | * | 6/1987 | Hirano et al. | 123/41.15 |
| 5,153,835 | * | 10/1992 | Hashimoto et al. | 701/114 |
| 5,884,243 | * | 3/1999 | Taniguchi et al. | 702/183 |
| 6,128,948 | * | 10/2000 | Shi et al. | 73/118.1 |

* cited by examiner

Primary Examiner—Noah P. Kamen
Assistant Examiner—Hai Huynh
(74) Attorney, Agent, or Firm—Vincent A. Cichosz (57) ABSTRACT

An improved method of diagnosing an engine cooling system through the use of a coolant temperature model based on existing sensor information. Proper operation of the engine thermostat and coolant temperature sensor is diagnosed based on an initial comparison of coolant temperature to ambient air temperature at key-on and a later comparison of coolant temperature to a predetermined regulated temperature. The coolant temperature model is used to trigger the initiation of the later comparison to ensure that the diagnostic is performed when the engine is fully warmed up. Advantageously, the modeled coolant temperature may be used for control purposes in the event that the diagnostic detects faulty operation of the coolant temperature sensor.

10 Claims, 4 Drawing Sheets

MODEL-BASED DIAGNOSTIC METHOD FOR AN ENGINE COOLING SYSTEM

TECHNICAL FIELD

This invention is directed to a method for detecting improper operation of an engine cooling system through the use of an engine coolant temperature model.

BACKGROUND OF THE INVENTION

A significant aspect of state-of-the-art automotive engine control pertains to so-called on-board-diagnosis of various engine components or sensors, particularly when improper operation of such components or sensors can adversely influence the engine emission controls. In the case of an engine cooling system, the diagnosis involves determining if the engine thermostat is operating correctly, and if the engine coolant temperature sensor is providing an accurate measurement. If the diagnosis reveals faulty operation of the thermostat or engine coolant sensor, the engine controller stores the fault information and activates a "check engine" indicator to advise the driver that the vehicle should be serviced soon.

While any component or sensor could theoretically be diagnosed through the use of additional sensors, such additional sensors significantly increase the cost of implementing the diagnostic function, and raise concerns over the reliability of the additional sensors themselves. Accordingly, there is a strong desire to implement the diagnostic functions using existing sensor information only. Further, it must be recognized that engine operation varies widely depending on both the driver and the environment. In the case of the engine cooling system, for example, the thermostat operation and the measured coolant temperature are influenced by a number of factors, such as engine fueling, driving schedule, heater operation, ambient air temperature, engine speed, vehicle speed, etc. Diagnosing methods that take many of these factors into account can be very complex and are typically very difficult to calibrate properly.

Accordingly, what is needed is a method of reliably diagnosing the proper operation of an engine cooling system that does not involve the use of additional sensors and that is easy to calibrate.

SUMMARY OF THE INVENTION

The present invention is directed to an improved method of diagnosing an engine cooling system through the use of a coolant temperature model based on existing sensor information. Proper operation of the engine thermostat and coolant temperature sensor is diagnosed based on an initial comparison of coolant temperature to ambient air temperature at key-on and a later comparison of coolant temperature to a predetermined regulated temperature. According to the invention, the coolant temperature model is used to trigger the initiation of the later comparison to ensure that the diagnostic is performed when the engine is fully warmed up. Advantageously, the modeled coolant temperature may be used for control purposes in the event that the diagnostic detects faulty operation of the coolant temperature sensor.

DESCRIPTION OF THE PREFERRED EMBODIMENT

Figure 1:
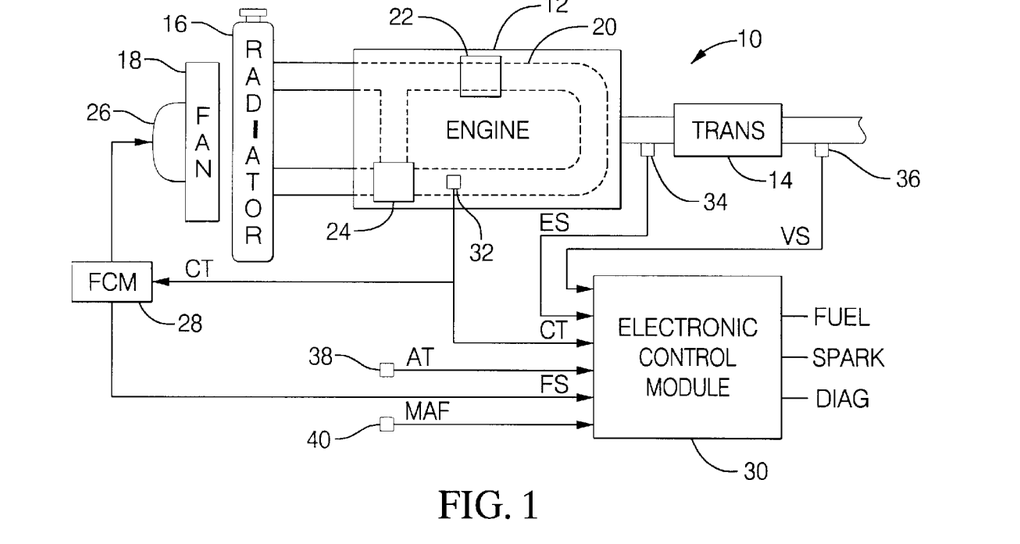
FIG. 1 is a system diagram of an engine control system including an electronic control unit for carrying out the diagnostic method of this invention.

Referring to FIG. 1, the reference numeral 10 generally designates an automotive power plant including an internal combustion engine 12, a transmission 14, a radiator 16, and a cooling fan 18. The radiator 16 contains a quantity of coolant for circulation though the engine 12, and the engine 12 has internal coolant circulation passages designated by the reference numeral 20.

An engine driven pump 22 circulates coolant in the passages 20, and a thermostat 24 controls the degree of fluid communication between the passages 20 and the radiator 16. The thermostat 24 is responsive to the engine coolant temperature, and closes to isolate the engine passages 20 from the radiator 16 when the engine coolant temperature is lower than a preset minimum temperature, referred to herein as Tstat_min. When the engine coolant temperature rises above Tstat_min, the thermostat 24 begins to open, allowing the radiator coolant to circulate through the engine passages 20, and becomes fully open when the engine coolant temperature reaches a preset maximum temperature, referred to herein as Tstat_max. In this way, the thermostat attempts to regulate the engine coolant temperature to a preset temperature referred to herein as Treg. The engine temperature regulation is assisted by the fan 18, which is selectively activated to blow ambient air across the radiator 16 and engine 12. Typically, the fan 18 is operated by an electric motor 26, which in turn, is activated by a Fan Control Module (FCM) 28 based on a measure of the engine coolant temperature (CT). If CT exceeds an upper threshold referred to herein as Tfan_max, the motor 26 is activated to turn on the fan 18; when CT subsequently drops below a lower threshold referred to herein as Tfan_min, the motor 26 is deactivated to turn off the fan 18.

The reference numeral 30 designates an electronic control module, or ECM, for diagnosing and controlling the operation of engine 12. To this end, the ECM 30 receives a number of inputs, including coolant temperature CT, the engine speed ES, the vehicle speed VS, the ambient air temperature AT, the fan status FS and the engine mass air flow MAF. Alternatively, the engine manifold absolute pressure MAP may be measured instead of the mass air flow MAF, in which case MAF may be calculated as a function of MAP and engine speed ES. These inputs are provided by various conventional sensors, including the coolant temperature sensor 32, the engine speed sensor 34, the vehicle speed sensor 36, the ambient air temperature sensor 38, and the mass air flow sensor 40. The fan status (i.e., activated or deactivated) is provided by the FCM 28 (or alternatively, ECM 30 may control the fan 18). In turn, the ECM 30 generates fuel control signals (FUEL) for application to the engine fuel injectors (not shown) and spark timing control signals (SPARK) for application to the engine ignition system (not shown). Additionally, the ECM carries out a diagnostic routine for determining the operating status of the thermostat 24 and engine coolant temperature sensor 32, and provides an output (DIAG) used to activate a driver alert in the event of a detected failure or faulty operation.

In general, the diagnosis of the engine cooling system is carried out by comparing measured coolant temperature CT to ambient air temperature AT at ignition key-on following a prolonged soak (off period), and later comparing the coolant temperature CT to the preset regulated temperature Treg. If CT is initially equivalent to AT, but later is significantly lower or higher than Treg, the thermostat 24 is diagnosed as being stuck open or stuck closed, respectively. If CT is initially lower than AT, and later is found to be significantly lower than Treg, the sensor 32 is diagnosed as being skewed or offset low. Finally, if CT is initially higher than AT, and later is found to be significantly higher than Treg, the sensor 32 is diagnosed as being skewed or offset high.

According to this invention, timing of the comparison of CT to Treg in the above-described diagnostic routine is determined based on the parameters of a mathematical model of the engine coolant temperature. Modeling the engine coolant temperature involves modeling both the engine coolant temperature and the radiator coolant temperature, as well as the coolant circulation and mixing of coolant between the engine 12 and radiator 16. For convenience, derivative terms are designated by prime, such as Q' for example.

The engine coolant temperature model comprehends heat rejection energy from injected fuel, heat loss to air, and coolant flow. In such terms, the net energy flow rate of the engine coolant (Qeng') may be represented as follows:

$$Qeng'=Qrej'-Qair'-Qrad' \quad (1)$$

where Qrej' is an additive energy flow rate due to combustion, Qair' is a subtractive energy flow rate due to air cooling, and Qrad' is a subtractive energy flow rate due to coolant exchange between the engine 12 and radiator 16.

The term Qrej' may be formulated in terms of the heat rejection to the engine coolant ($\eta$) which can be approximated as a linear function of the engine mass air flow MAF. In other words, the term $\eta$ is approximated as:

$$\eta=A*MAF+B \quad (2)$$

where A and B are calibrated constants.

When the commanded air-to-fuel ratio (A/Fcmd) is leaner than the stoichiometric ratio (Stoic), the combustion heat energy is dependent on the amount of fuel injected because there is excess intake oxygen inside the engine combustion chamber. Otherwise, the combustion heat energy is dependent on the amount of intake oxygen. Thus, when A/Fcmd is greater than Stoic, Qrej' is given as follows:

$$Qrej'=\eta*(Nfueling/Ncyl)*MAF*F/Acmd*Qhv \quad (3)$$

where the ratio (Nfueling/Ncyl) represents the number of activated fuel injectors per engine cylinder, the product (MAF*F/Acmd) represents the mass flow rate of fuel injected by the injectors, and Qhv represents the heat value of the fuel. Conversely, when A/Fcmd is less than or equal to Stoic, Qrej' is given as follows:

$$Qrej'=\eta*(Nfueling/Ncyl)*MAF*(1/Stoic)*Qhv \quad (4)$$

The term Qair' (i.e., the energy flow rate from the engine 12 to ambient air) stems mainly from convection heat transfer, characterized by a heat transfer coefficient Heng. The coefficient Heng is dependent both on vehicle speed VS and cooling fan operation status FS. However, if desired, it can be described simply as a function of fan status FS if the air speed in the engine compartment is not significantly influenced by vehicle speed. Thus, Qair' may be given as:

$$Qair' \: Heng*Aeng*(Teng-AT) \quad (5)$$

where Aeng is the engine surface area, Teng is the modeled engine coolant temperature, and AT is the measured air temperature.

Finally, the term Qrad' (i.e., the engine coolant heat loss via the radiator 16) can be expressed as a function of the coolant temperature difference between the engine outlet and engine inlet (Teng-Teng_in) and the mass flow rate of coolant (MFc), as follows:

$$Qrad'=MFc*Cc*(Teng-Teng\_in) \quad (6)$$

The mass flow rate of coolant (MFc), in turn, is dependent on the speed of pump 22 (which is proportional to engine speed ES) and opening area Astat of thermostat 24. As explained above, the opening area Astat varies between minimum and maximum values as the coolant temperature varies between Tstat_min and Tstat-max. Thus, between temperatures Tstat_min and Tstat_max, Astat may be defined as the dimensionless ratio:

$$Astat=(Teng-Tstat\_min)/(Tstat\_max-Tstat\_min) \quad (7)$$

The radiator coolant model is used to formulate the engine inlet coolant temperature Teng_in, and comprehends radiator heat transfer, coolant flow and circulation. From the energy balance between lost energy through radiator and lost energy of coolant (Qrad'), Teng_in can be formulated as:

$$Teng\_in=Teng-[(Arad*Hrad)/(MFc*Cc)]*(Teng-AT) \quad (8)$$

where Arad is the surface area of the radiator 16, and Hrad is the heat transfer coefficient of radiator 16, which is dependent on the vehicle speed VS and cooling fan operating status FS.

Figure 2:
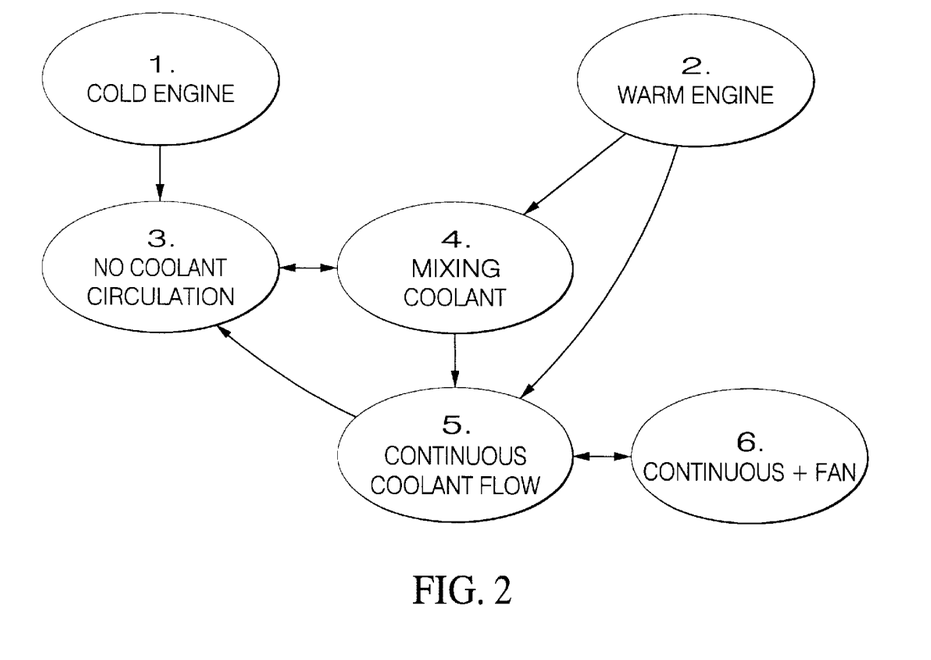
FIG. 2 is a state diagram depicting several different possible operating states of the engine cooling system during a period of vehicle operation.

It is convenient to think of the various modes of operation of the coolant system in terms of a state diagram, as shown in FIG. 2. The initial states are either State 1 (Cold Start) which represents engine starting with CT<Tstat_min, or State 2 (Warm Start) which represents engine starting with CT≧Tstat_min. In State 3 (No Circulation), the engine 12 is running, but thermostat 24 is closed and there is no coolant circulation between the engine passages 20 and the radiator 16. In State 4, (Mixing), the engine 12 is running, and the thermostat 24 has just opened to permit some mixing of the engine and radiator coolant. In State 5 (Continuous Circulation), the engine is running and the all of the coolant in the radiator 16 has mixed with the coolant in the engine passages 20. Finally, in State 6 (Continuous+Fan), the engine coolant is heated to the point that the cooling fan 18 is activated. It will be noted that some state changes are bidirectional; for example, the system may switch back and forth between State 3 and State 4 as the coolant temperature rises and falls.

In terms of the coolant system model, State 1 and State 2 can be considered as initialization states. In either case, the measured coolant temperature CT at key-on is used as the initial engine coolant temperature; that is:

$$Teng\_init=CTkey\_on \quad (9)$$

The initial radiator coolant temperature depends on the soak time TIMEsoak since the previous key-off. In the event of a long soak time, the radiator coolant temperature Trad may be initialized at CTkey_on, but for shorter soak times, Trad is initialized to a value between the previously modeled radiator coolant temperature (Trad_last) and CTkey_on.

If the coolant temperature sensor 32 has been identified as being faulty, the coolant temperatures are initialized in terms of the initial air temperature (ATkey_on), the coolant temperature at the previous key-off (Teng_last), and the soak time (TIMEsoak) since the previous key-off. In this case, Teng_init may be given as:

$$\text{Teng\_init} = \text{ATkey\_on} + \text{Gsoak}(\text{Teng\_last} - \text{ATkey\_on}) \qquad (10)$$

where Gsoak is a gain term determined as a function of TIMEsoak.

After initialization, the coolant system transitions to States 3, 4 or 5 depending on the engine coolant temperature Teng, and if the thermostat 24 is open, the accumulated or integrated coolant flow, INT(MFc). If Teng<Tstat_min, the system transitions from State 1 to State 3; if Teng>=Tstat_min, and INT(MFc)<Mr (the mass of the radiator coolant), the system transitions to State 4; if Teng>=Tstat_min, and INT(MFc)>=Mr, the system transitions to State 5.

If the system is in State 3, there is no coolant circulation, and the net energy of supplied heat rejection and heat transfer energy loss can be equated to the coolant temperature change Teng'. Thus, $$\text{Qrej'} - \text{Qair'} = \text{Teng'} * \text{Me} * \text{Cc} \qquad (11)$$

where Me is the effective engine mass and Cc is the specific heat of the engine coolant. The effective engine mass for a given engine 12 may be determined as the sum:

$$\text{Me} = [\Sigma(\text{Mcomp} * \text{Ccomp})]/\text{Cc} \qquad (12)$$

where Mcomp and Ccomp represent the mass and specific heat, respectively, of the various major engine components, such as the block, heat, crankshaft, oil, etc. Combining equations 4, 5, 6, 11 and 12, the engine coolant temperature change Teng' for State 3 with stoichiometric or rich fueling can be modeled as:

$$\text{Teng'} = (1/(\text{Me}*\text{Cc})) * \{\eta*(\text{Nfueling}/\text{Ncyl})*\text{MAF}*(1/\text{Stoic})*\text{Qhv} - \text{Heng}*\text{Aeng}*(\text{Teng}-\text{Teng\_in})\} \qquad (13)$$

Combining equations 3, 5, 6, 11 and 12, the engine coolant temperature change Teng' for State 3 with lean fueling can be modeled as:

$$\text{Teng'} = (1/(\text{Me}*\text{Cc})) * \{\eta*(\text{Nfueling}/\text{Ncyl})*\text{MAF}*\text{F}/\text{Acmd}*\text{Qhv} - \text{Heng}*\text{Aeng}*(\text{Teng}-\text{Teng\_in})\} \qquad (14)$$

The radiator coolant temperature Trad in State 3 changes as a function of ambient air temperature AT, vehicle speed VS and the time (TIME3) in State 3. Thus Trad may be given as:

$$\text{Trad} = \text{Teng\_init} - [(\text{Hrad}*\text{Arad})/(\text{Mr}*\text{Cr})](\text{Teng\_init} - \text{AT})(\text{TIME3}) \qquad (15)$$

where Hrad is the heat transfer coefficient of the radiator 16 (determined as a function of VS), Arad is the area of radiator 16, Mr is the mass of the radiator coolant, and Cr is the specific heat of the radiator coolant. In the event that the system transitioned to State 3 from State 4 or State 5, the radiator coolant temperature Trad is adjusted to account for the time (TIMEopen) the thermostat 24 was open, as follows:

$$\text{Trad} = \text{Tstat\_min} - [(\text{Hrad}*\text{Arad})/(\text{Mr}*\text{Cr})](\text{Tstat\_min} - \text{AT})(\text{TIMEopen}) \qquad (16)$$

where Tstat_min is the engine coolant temperature at which the thermostat begins to open.

If the system is in State 4, the engine coolant temperature model must take into account mixing of the radiator coolant with the engine coolant, in addition to the heat rejection quantity Qrej'. In this respect Mr(t) is the portion of the coolant in the engine 12 that came from the radiator 16, and Me(t) is the portion of the coolant in the engine 12 that was present at thermostat opening. Thus, Mr(t) and Me(t) are defined as follows:

$$Mr(t) = \mathop{INT}_{time\ open}^{time\ close}(MFc\,dt), \text{ and} \qquad (17)$$

$$\text{Me}(t) = \text{Me} - \text{Mr}(t) \qquad (18)$$

where MFc is the mass flow rate of coolant and Me is the effective engine mass of coolant in the engine 12. The mass flow rate of coolant can be formulated as a function of linearized thermostat opening area (Astat) and a nonlinear coefficient (Ccoolflow) of coolant flow rate depending on the engine speed. The coefficient is defined as follows:

$$\text{MFc} = \text{Astat}*\text{Ccoolflow}*\text{ES} \qquad (19)$$

where ES is the measured engine speed.

In the engine 12, the heat quantity due to the combination of the two coolant portions is therefore:

$$\text{Me}*\text{Ce}*\text{Teng\_mix\_init}(t) = (\text{Mr}(t)*\text{Cr}*\text{Trad}) + (\text{Me}(t)*\text{Ce}*\text{Tstat\_min}) \qquad (20)$$

where Teng_mix init(t) is a intermediate engine coolant temperature just taking into accounting two coolants mixing. Then, Teng can be expressed as:

$$\text{Me}*\text{Ce}*\text{Teng} = \text{Me}*\text{Ce}*\text{Teng\_mix init}(t) + \text{INT}(\text{Qreg'}) - \text{INT}(\text{Qair'}) \qquad (21)$$

Combining equations 19 and 20 with the energy balance equation 1, the engine coolant temperature Teng can be modeled as:

$$\text{Teng} = [1/(\text{Me}*\text{Ce})][(\text{Mr}(t)*\text{Cr}*\text{Trad}) + (\text{Me}(t)*\text{Ce}*\text{Tstat\_min}) + \text{INT}(\text{Qrej'}) - \text{INT}(\text{Qair'})] \qquad (22)$$

A similar approach is used to model the radiator coolant in State 4, but is achieved in two steps. First, the temperature of the coolant entering the radiator (Trad_eng_out) is determined. To this end, the heat quantity of the radiator coolant at the engine outlet (that is, Mr*Cr*Trad_eng_out) is viewed as the sum of the Me(t) and Mr(t) components. That is:

$$\text{Mr}*\text{Cr}*\text{Trad\_eng\_out} = [\text{Mr}(t)*\text{Cr}*\text{Tr\_stat\_min}] + [\text{Me}(t)*\text{Ce}*\text{Teng}] \qquad (23)$$

where Trad_stat_min is the radiator coolant temperature Trad when Teng reaches Tstat_min. Solving for Trad_eng_out yields:

$$\text{Trad\_eng\_out} = [1/(\text{Mr}*\text{Cr})][(\text{Mr} - (\text{INT}(\text{MFc})))*\text{Cc}*\text{Tr\_stat\_min}) + (\text{Cc}*\text{Teng}*\text{INT}(\text{MFc})] \qquad (24)$$

And second, the radiator coolant temperature Trad is determined. To this end, the heat flow through the radiator Qrad' is defined both in terms of the temperature difference (Trad_eng_out−Trad), and the temperature difference (Trad eng_out−AT). That is:

$$Qrad'=MFc*Cr*(Trad\_eng\_out-Trad)=Arad*Hrad*(Trad\_eng\_out-AT) \quad (25)$$

Solving for Trad yields:

$$Trad=Trad\_eng\_out-[Arad*Hrad/(MFc*Cc)](Tr\_eng\_out-AT) \quad (26)$$

where the Arad is the surface area of the radiator and Hrad is the heat transfer coefficient of the radiator.

If the system is in State 5, the coolant is in a state of continuous circulation, the net energy flow rate (Qrej'−Qrad'−Qair') can be equated with the combined engine and radiator heat rejection based on the coolant temperature change Teng'. Thus, $$Qreq'-Qrad'-Qair'=Teng'*(Me+Mr)*Cc \quad (27)$$

where Me is the mass of engine coolant, Mr is the mass of radiator coolant, and Cc is the specific heat of the engine coolant. Combining equations 4, 5, 6 and 27, the engine coolant temperature change Teng' for State 5 with stoichiometric or rich fueling can be modeled as:

$$Teng'=[1/((Me+Mr)*Cc)]*[(MAF*\eta*(Nfueling/Ncyl)*(1/Stoic)*Qhv)-(MFc*Cc(Teng-Trad))-(AengHeng(Teng-AT)] \quad (28)$$

Combining equations 3, 5, 6 and 27, the engine coolant temperature change Teng' for State 5 with lean fueling can be modeled as:

$$Teng'=[1/((Me+Mr)*Cc)]*[(MAF*\eta*(Nfueling/Ncyl)*F/Acmd*Qhv)-(MFc*Cc(Teng-Trad))-(AengHeng(Teng-AT))] \quad (29)$$

The radiator coolant temperature Trad in State 5 changes as a function of ambient air temperature AT, vehicle speed VS, mass flow of coolant MFc, and the temperature difference (Teng−AT). Thus Trad may be given as:

$$Trad=Teng-[(Hrad*Arad)/(MFc*Cc)](Teng-AT) \quad (30)$$

where Hrad is the heat transfer coefficient of the radiator 16 (determined as a function of VS), Arad is the surface area of radiator 16, and Cc is the specific heat of the coolant.

Figure 3:
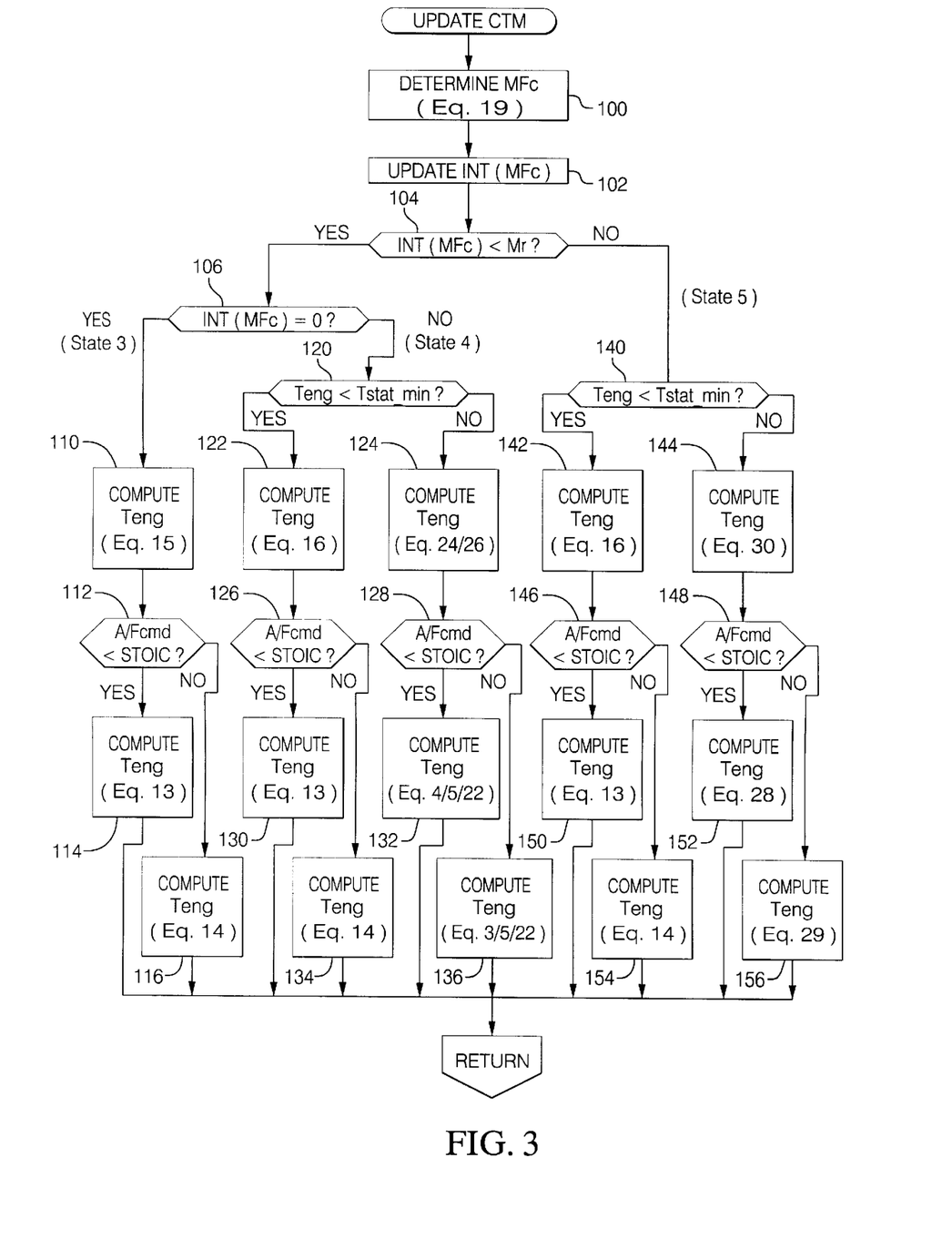
FIG. 3 depicts a flow diagram representative of computer program instructions executed by the electronic control unit of FIG. 1 in updating the engine coolant temperature model according to this invention.

Thus, to update the engine coolant system model after initialization, the ECM 30 must determine what state the system is in, and then compute Teng and Trad using the appropriate model equations. A flow diagram representative of this process is depicted in FIG. 3, where the block 100 is first executed to determine the mass flow rate of the engine coolant by using equation 19. Then, the integrated mass flow of the coolant (INT(MFc)) is calculated in the block 102. Then the INT(MFc) is compared (block 104) with a threshold (Mr) to decide if there has been enough integrated coolant flow in the engine cooing system. If block 104 is answered in the positive (i.e., INT(MFc)<Mr), the block 106 is executed to determine if the engine is in State 3 or 4.

If the State is determined to be 3, Trad is calculated by using equation 15 in the block 110. The commanded air to fuel ratio (i.e, A/Fcmd) is compared in the block 112 to determine the equation for the Teng calculation. If A/Fcmd is smaller than Stoic in the block 122, equation 13 is used to calculate the engine model temperature in the block 114. Otherwise, equation 14 is used for Teng calculation in the block 116.

If the engine State is determined to be 4 (i.e., 0<INT(MFc)<Mr), the model coolant temperature Teng is compared with a threshold (Tstat_min) at block 120. If Teng is lower than Tstat_min, which means the radiator coolant began to mix with engine coolant but not all of the radiator coolant has been mixed with the engine coolant, radiator coolant temperature (Trad) is calculated by using equation 16 at the block 122. Then, the commanded air to fuel ratio (i.e., A/Fcmd) is compared to Stoic at the block 126 to determine Teng by using appropriate equation at block 130 or 134. If the Teng is determined to be greater than or equal to Tstat_min in the block 120, equation 24 and 26 are executed to calculate Trad at the block 124. Then the A/Fcmd is compared to Stoic at the block 128. If the A/Fcmd is rich (i.e., A/Fcmd<Stoic), equation 4, 5 and 22 are executed in block 132 to calculate Teng. Otherwise, equations 3, 5, 22 are executed in block 136 to calculate Teng.

When the engine State is determined to be 5 in the block 104 (i.e., INT(MFc)<Mr), the Teng is compared with a threshold (Tstat_min) at block 140 to determine which block will be executed (i.e., 142 or 144). If Teng is lower than Tstat_min, equation 16 is executed in block 142 to calculate Trad. Then, the A/Fcmd is compared to Stoic at block 146 to determine an appropriate equation to be used for the calculation of Teng. If A/Fcmd is smaller than Stoic, equation 13 is executed in block 150 to calculate Teng. Otherwise, (i.e., A/Fcmd<Stoic), equation 14 is used in block 154 to calculate Teng. If Teng is greater than or equal to Tstat_min in the block 140, equation 30 is used to calculate Trad at block 144. Then, A/Fcmd is compared to Stoic at the block 148 to determine which equation will be used to calculate Teng. If A/Fcmd is smaller than Stoic equation 28 is used as indicated in the block 152. Otherwise, equation 29 is used in the block 156 to calculate Teng.

According to this invention, the coolant temperature model provides an independent assessment that the engine has fully warmed up for purposes of initiating the cooling system diagnostic routines, using only customarily available engine control sensor information. The principle unknown in this regard is the amount of heat removed from the coolant due to operation of the vehicle passenger compartment heater. While the coolant temperature model could be easily adapted to comprehend the effects of heater operation if the appropriate sensor information were available to the ECM, it is assumed that such information is not readily (or cost effectively) available, and instead, the diagnostic routine compensates for the potential discrepancy by accumulating the derivative of the modeled coolant temperature (Teng') and comparing the accumulated derivative (ACCUM) to a calibrated threshold.

Figure 4A:
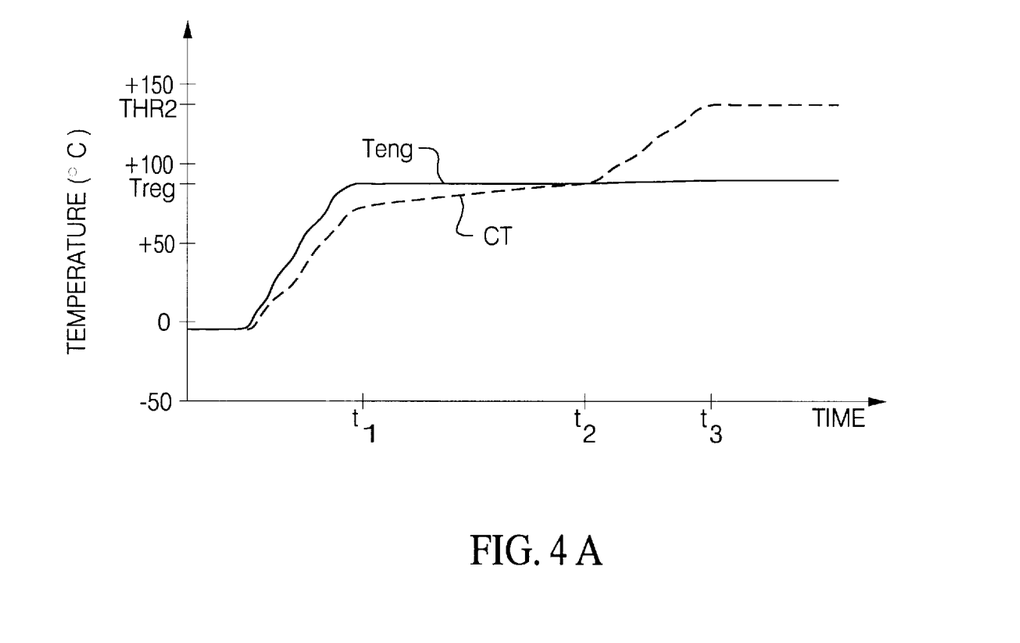
FIG. 4, Graphs A and B, graphically depict the operation of the engine coolant temperature model during an engine warm-up cycle.
Figure 4B:
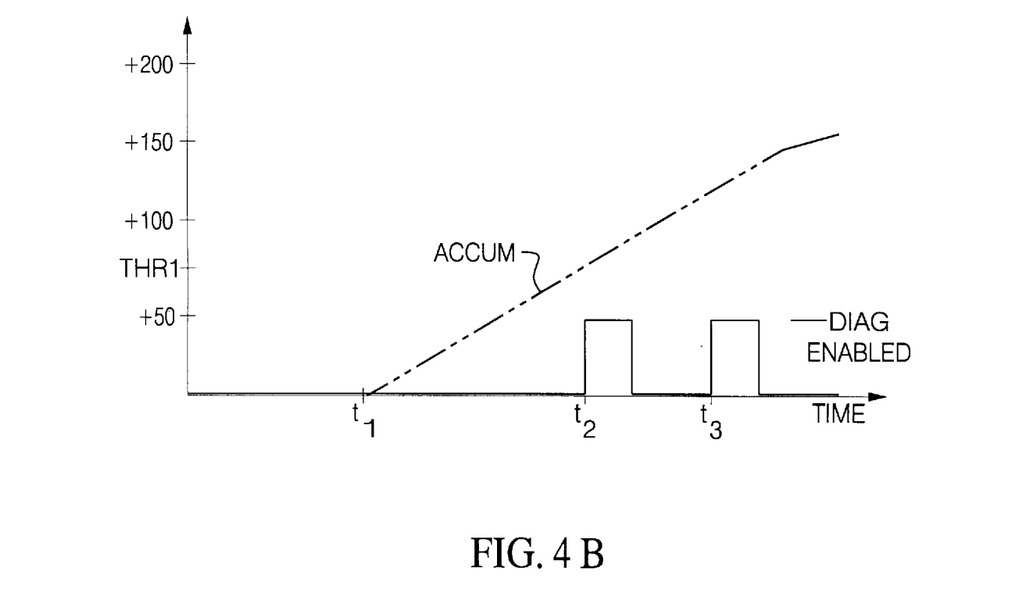

The operation of the diagnostic routine is illustrated in Graphs A and B of FIG. 4, which depict Teng, CT and ACCUM as a function of time during an engine warm up period with an initial air temperature of −15° C. and the heater at a maximum heat setting. In Graph A, the modeled coolant temperature Teng is depicted by the broken trace, while the measured coolant temperature CT is depicted by the solid trace. In Graph B, the accumulated temperature derivative ACCUM is depicted by the broken trace, and the status of a diagnostic flag is depicted by the solid trace. As seen in Graph A, Teng rises faster than the measured value CT due to the un-modeled heat loss, with Teng reaching the nominal thermostat regulating temperature Treg at time t1. At such point, Teng is artificially limited to Treg, and the temperature derivative (Teng') is accumulated, as seen by the broken trace of Graph B. The value of Teng', and hence ACCUM, while insensitive to heater operation, varies in accordance with ambient and driving conditions, as explained above. At time t2, the measured coolant temperature CT reaches the limited value Treg, indicating that the engine has actually warmed up for purposes of initiating the cooling system diagnostics. According to the invention, this point is recognized by comparing the accumulated derivative (which varies with driving schedule and ambient conditions) to a threshold, designated at THR1 on the temperature scale of Graph B. The threshold THR1 may be characterized as a function of initial coolant temperature CT(0), or the ambient temperature AT, whichever is lower, by carrying out a series of calibration tests to determine the value of ACCUM when the actual coolant temperature reaches Treg. As indicated by the solid trace in Graph B, the cooling system diagnostic is initiated at time t2, and continues for a predetermined interval, such as 30 seconds. The specific diagnostic initiated at time t2 detects the occurrence of a stuck-open thermostat or a skewed-low coolant temperature sensor. At time t2, the limiting of Teng is discontinued, and Teng resumes rising due to the un-modeled heat loss. Finally, at time t3, Teng reaches a predetermined threshold, designated on the temperature scale of Graph A as THR2, and a second diagnostic routine for stuck-closed thermostat and skewed-high coolant temperature sensor is initiated, as indicated by the solid trace in Graph B.

Figure 5:
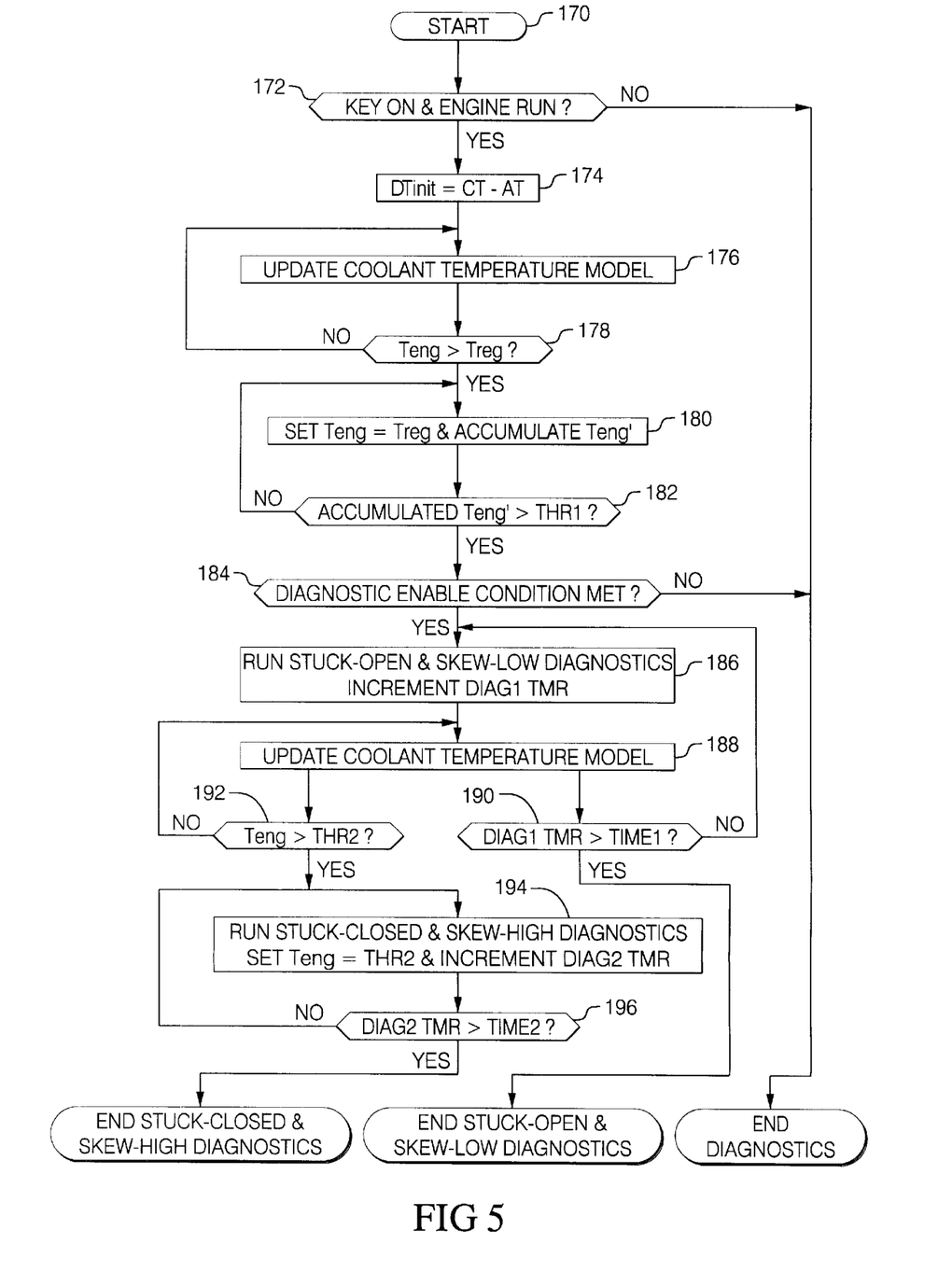
FIG. 5 depicts a flow diagram representative of computer program instructions executed by the electronic control unit of FIG. 1 in carrying out a cooling system diagnostic routine according to this invention.

The overall diagnostic routine is described by the flow diagram of FIG. 5, where the initialization block 170 designates a series of instructions for initializing the diagnostic and model parameters at the initiation of a period of vehicle operation. In regard to the diagnostic function, this may include resetting the diagnostic timers and flags. In regard to the modeling function, the initialization includes determining initial values for Teng and Trad, as explained above in reference to equations 9 and 10. At the time of ignition key-on and engine running, detected by block 172, block 174 is executed to compute the initial temperature differential ΔTinit between the measured coolant temperature CT and the measured ambient air temperature AT. Thereafter, the block 176 is executed to update the coolant temperature model, as described above in reference to the flow diagram of FIG. 3. The coolant temperature model is continuously updated until the modeled temperature Teng reaches the nominal thermostat regulating temperature Treg, as detected by block 178. When Teng reaches Treg, the blocks 180–182 are executed to detect a "fully warmed up" condition of the engine coolant. The block 180 limits Teng to Treg, and accumulates the modeled temperature derivative Teng'. When the accumulated derivative reaches the calibrated threshold THR1, as detected by block 182, the engine coolant is deemed to be fully warmed up, and the cooling system diagnostics can be initiated if the diagnostic enable conditions are met, as determined at block 184. In general, the diagnostic enable conditions are defined to prevent initiation of the diagnostic routines under certain driving conditions that make reliable cooling system diagnosis difficult, such as extended deceleration fuel cut off or extended idle time. Additionally, initiation of the diagnostic routines is prevented if the time since the engine was last operated (that is, the soak time) is less than certain time so that the diagnostic will not be affected by the previous driving cycle.

If the conditions for initiating the cooling system diagnostics (that is, blocks 182 and 184) are met, the block 186 is executed to run the diagnostic checks for stuck-open thermostat or skewed-low coolant temperature sensor, and to increment a first diagnostic timer DIAG1 TMR. Then block 188 updates the coolant temperature model. The diagnostics of block 186 are repeated (along with updating of the coolant temperature model) until DIAG1 TMR reaches a reference time TIME1. The diagnostics for stuck-closed thermostat or skewed-high coolant temperature sensor (block 194) are executed when the conditions of blocks 182 and 184 are met, and Teng reaches a maximum predefined threshold THR2, as determined at block 192. Block 194 also serves to limit Teng to the threshold THR2 and to increment a second diagnostic timer DIAG2 TMR. The diagnostics of block 194 are repeated until DIAG2 reaches a reference time TIME2, as determined at block 196.

In summary, this invention provides a model based diagnostic method for an engine cooling system, with the model being used to initiate the diagnostic routines at an appropriate time, resulting in more reliable diagnostic information. In the preferred embodiment, only customarily available engine control sensor information is utilized, and the model is easily calibrated. While described in reference to the illustrated embodiment, it is expected that various modifications will occur to those skilled in the art. For example, the accumulation of Teng' may be replaced by the accumulation of sensed mass air flow MAF. Accordingly, methods incorporating these and other modifications may fall within the scope of this invention, which is defined by the appended claims.

What is claimed is:

1. A method for diagnosing the operation of a cooling system including a coolant temperature sensor and a thermostat for controlling coolant flow between an engine and a radiator so as to regulate the temperature of engine coolant to a desired regulating value, the method comprising the steps of:

initially comparing the sensed coolant temperature to a measure of ambient air temperature at an initiation of engine operation;

modeling the coolant temperature independent of the coolant temperature sensor, assuming proper operation of the thermostat;

determining when the modeled coolant temperature is indicative of a fully warmed up condition of the engine;

subsequently comparing the sensed coolant temperature to said desired regulating value when it is determined that the modeled coolant temperature indicative of a fully warmed up condition of the engine; and diagnosing the operation of the coolant temperature sensor and the thermostat based on the initial and subsequent comparisons.

2. The method of claim 1, wherein the step of modeling the coolant temperature includes the steps of:

determining a first energy flow quantity to the coolant due to heat rejection from the engine;

determining a second energy flow quantity from the coolant to air;

determining a third energy flow quantity from the coolant to the radiator; and determining temperature of the engine coolant based on said first, second and third energy flow quantities.

3. The method of claim 1, including the step of:

initializing the modeled coolant temperature in accordance with the measured coolant temperature.

4. The method of claim 1, wherein the system includes a heater that removes heat from the engine coolant, and the method includes the steps of:

determining when the sensed coolant temperature should have reached the desired regulating value despite operation of said heater, and generating a diagnostic initiation signal in response to such determination; and initiating the subsequent comparison of the sensed coolant temperature to the desired regulating value in response to the diagnostic initiation signal.

5. The method of claim 4, including the step of:

limiting the modeled coolant temperature to the desired regulating value until the diagnostic initiation signal is generated.

6. The method of claim 5, wherein the step of determining when the sensed coolant temperature should have reached the desired regulating value includes the steps of:

periodically determining a rate of change of the modeled coolant temperature;

accumulating the determined rate of change once the modeled coolant temperature reaches the desired regulating value; and determining that the sensed coolant temperature should have reached the desired regulating value when the accumulated rate of change reaches a threshold value.

7. The method of claim 6, wherein the threshold value is determined as a function of the lower of the measured coolant temperature at the initiation of engine operation and a temperature of the outside air.

8. The method of claim 1, including an engine controller for controlling operation of the engine based on the sensed coolant temperature, the method including the step of:

substituting the modeled coolant temperature for the sensed coolant temperature if faulty operation of the coolant temperature sensor is diagnosed.

9. The method of claim 1, including the step of:

initializing the modeled coolant temperature based on an initial air temperature measurement, the modeled coolant temperature from a prior period of engine operation, and a soak time since the prior period of engine operation if the coolant temperature sensor has been diagnosed as being faulty.

10. The method of claim 9, wherein the modeled coolant temperature is initialized in accordance with:

$$Atkey\_on + Gsoak(Teng\_last - Atkey\_on)$$

where Atkey_on is the initial air temperature measurement, Teng_last is the last modeled coolant temperature from a prior period of engine operation, and Gsoak is a gain factor based on the soak time since the prior period of engine operation.

* * * * *